Nov. 10, 1964     A. YURDIN     3,156,584
METHOD AND APPARATUS FOR CLEANING PIPE LINES
Filed July 9, 1963
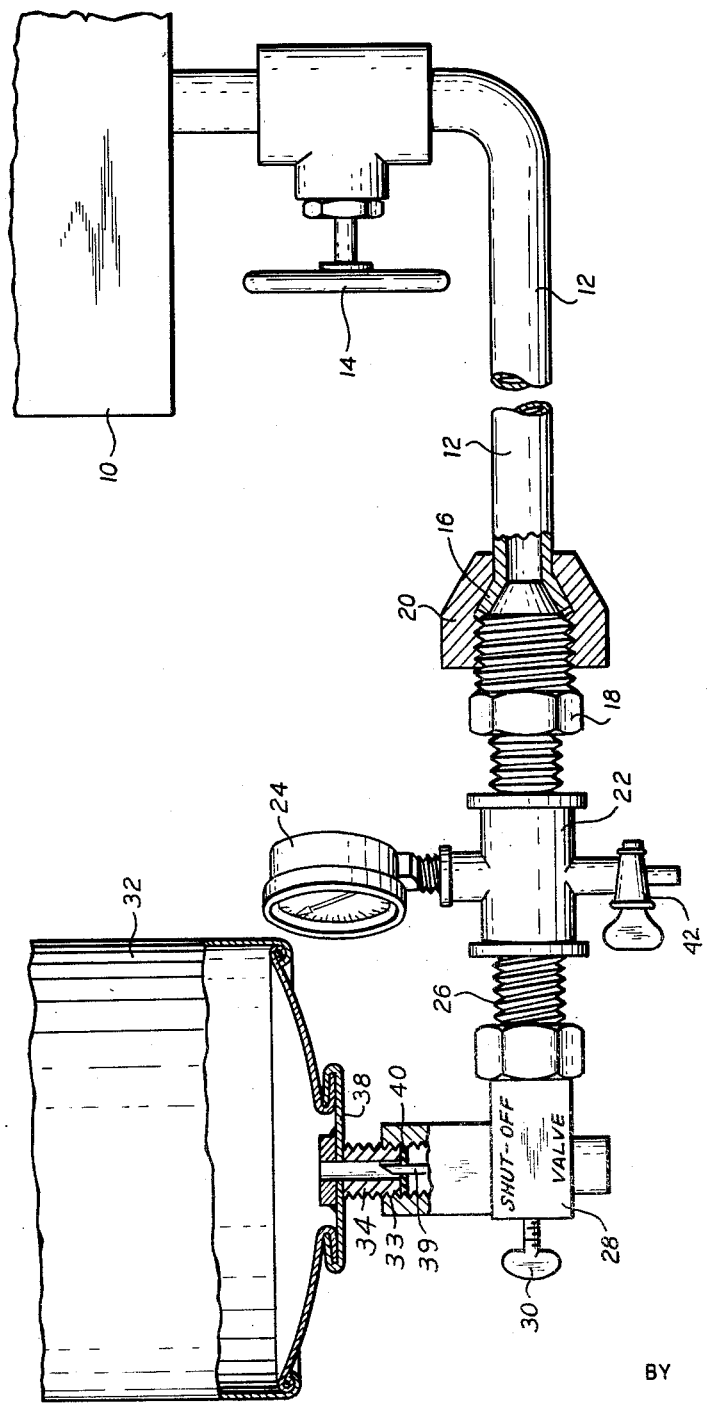
INVENTOR
Alfred Yurdin
BY Emery, Whittemore,
Sandoe & Graham
ATTORNEYS.

3,156,584
METHOD AND APPARATUS FOR CLEANING
PIPE LINES
Alfred Yurdin, 20 Madison Ave., Maplewood, N.J.
Filed July 9, 1963, Ser. No. 293,734
9 Claims. (Cl. 134—17)

This invention relates to methods and apparatus for removing obstructions from pipe lines. It is particularly intended for use with fuel oil lines, but is not limited to such uses.

It is an object of the invention to provide an improved method for removing obstructions from pipe lines, and especially for removing sludge accumulations from pipe lines leading from a fuel oil tank to an oil burner.

Another object of the invention is to provide improved apparatus which is conveniently portable and which can be quickly connected to, and disconnected from, a line which has become clogged. It is another object to provide apparatus which combines the mechanical force of a compressed gas with the chemical effect of atomized solvent to open up obstructed lines and at the same time clean them to substantially their original internal cross section so that they will not become clogged again after short periods of use.

The preferred embodiment of the invention includes a liquefied gas carrier for solvent material, and includes the feature of discharging the carrier and the solvent from a common nozzle under circumstances which atomize the solvent into the most minute particles for more effective distribution in the line to be cleaned. The preferred embodiment includes pressure-indicating means for informing the operator of the condition of the line and the progress of the cleaning operation.

Other objects, features and advantages of the invention will appear or be pointed out as the description proceeds.

The drawing, forming a part hereof, shows apparatus for cleaning pipe lines in accordance with this invention, the showing being diagrammatic and partly in section.

A fuel oil storage tank 10 has a pipe line 12 for supplying oil to an oil burner, or other location where the oil is to be used. There is a shut-off valve 14 at the upstream end of the pipe line 12.

At the other end of the pipe line 12 there is a flange 16 which co-operates with a fitting at an oil burner or other apparatus to which oil is to be supplied. This flange 16 is merely representative of detachable connecting means by which the pipe line 12 connects with the equipment in which the oil is used. When the line 12 becomes clogged, it is disconnected from the equipment at the flange 16 and the flange is clamped to a connection fitting 18 by a conventional clamping nut 20.

Beyond the fitting 18 there is a T 22 with a gauge 24 connected to its branch outlet. On the other side of the T 22, a fitting 26 connects the T with a valve assembly 28, operated by a handle 30.

The valve assembly 28 is connected with a pressure can 32 such as is used as a shipping container for refrigerant gas, and other gas under pressure. The valve assembly 28 is connected with the can 32 by screw threads 33 that screw over a fitting 34 secured to one end 38 of the can 32.

The valve assembly 28 has a hollow needle 39 which pierces a seal 40 at the end of the fitting 34. This illustration is diagrammatic and conventional packing may be provided for preventing leakage of gas between the connected parts of the valve assembly 28 and can 32.

There are other types of valve assemblies for piercing such cans, some of these assemblies being constructed with brackets that hook over a flange on the can. These constructions are conventional and the valve assembly 28 and can 32 are merely representative of an expendable pressure container for liquefied gas and a detachable valve assembly for controlling the discharge of the contents of the pressure container.

In the preferred embodiment of the invention, the can 32 is charged with Freon "12" in a liquefied condition, and the Freon is mixed with a solvent and additives, as explained hereinafter. Other compressed and liquefied gases can be used in place of Freon "12" but Freon "12" has the advantage of being non-flammable, unreactive with the oil and solvent, inexpensive and easily procurable as a standard commercial product.

When the apparatus is used, the outlet of the can 32 is placed bottom end up, as illustrated in the drawing; so that pressure of the vapor above the liquid will force the liquid from the can through the valve assembly 28 and through the valve fittings and into the pipe line 12.

When the handle 30 is first operated to open the valve element of the valve assembly 28, there is a rush of Freon past the valve element and an instantaneous evaporation of the Freon at the reduced pressure existing on the downstream side of the valve element. This explosive vaporisation of the liquid Freon causes a minute atomization of the solvent and other additives which are dissolved in the Freon.

Freon gas with the atomized solvent and additives rushes through the fittings into the pipe line 12 until the obstruction in the pipe line is encountered. Pressure then builds up on the downstream side of the valve assembly 28; and this build-up in pressure is indicated on the gauge 24.

If the pipe line 12 is totally clogged, and the obstruction cannot be pushed out of the pipe line by the mechanical pressure of the gas, then the pressure of the Freon in the pipe line 12 builds up to the full pressure of the can 32, for example, to 75 pounds per square inch, this value being given merely by way of illustration.

With sufficient pressure rise in the pipe line 12, the Freon will exist in a liquid form. Another effect of the pressure rise is that the original Freon wave front, which strikes the obstruction in the pipe, is followed by the movement of additional Freon and its entrained solvent and additives into the pipe line and up to the obstruction as the Freon pressure builds up. The amount of solvent which contacts the obstruction is thus increased, and the method of this invention obtains a good original coating of solvent on the face of the obstruction partly by virtue of the inertia of the original rush of gas into the region of the obstruction.

The solvent penetrates the obstruction in the pipe line 12 and softens the obstruction so that it is no longer capable of resisting the pressure of the Freon. Ordinarily, the obstruction will break through near the central axis of the pipe line and this permits a limited flow of the Freon, or other carrier gas, into the oil beyond the obstruction. The liquid oil behind the obstruction is pushed back into the tank 10 and because of the reduced pressure beyond the obstruction, the Freon again vaporizes rapidly, producing violent agitation in the region of the obstruction and along the inside surfaces of the pipe line 12. This mechanical agitation, resulting from vaporization and flow velocity of the Freon, causes the solvent and other additives to scour the inside surface of the pipe line. The opening through the obstructed portion is expanded in cross section and the entire obstruction is rapidly removed by the scouring action.

This invention is vastly superior to the conventional methods using carbon dioxide capsules for blowing out clogged lines. One reason for this superiority is that the carbon dioxide capsules have no solvent effect and unless they can remove the deposit by mechanical pressure alone, they are totally ineffective. Even when the carbon dioxide pressure can successfully force an opening through the obstruction, the cleaning action is not so thorough as with the present invention because a small opening through the obstruction permits the carbon dioxide to escape leaving broken sludge particles which may be pulled up into the pump when an oil burner is reconnected to the line and width resulting clogging or damage to the pump. The principle of the operation is different from applicant's invention since there is no change from liquid to vapor phase with resulting agitation and scouring within the pipe line.

The present invention has great advantages when used on partially clogged lines; that is, on lines where some liquid flow occurs but it is insufficient because the open cross section in the pipe line is greatly reduced by accumulations on the inside surface of the pipe. Under such circumstances, the action of this invention is somewhat different than with fully clogged lines. The pressure within the pipe line does not build up to the full pressure of the supply can 32 and the pressure in the pipe line may not be sufficient to cause any liquid Freon to exist in the pipe line. However, the flow of the Freon through the partially obstructed section of the pipe line deposits increasing amounts of solvent on the walls of the pipe line and on the accumulations clinging to the walls. The accumulations thus became progressively softer and are eventually carried back into the tank 10 where they can mix with the oil in their softened condition so as to subsequently pass through the pipe line without causing further obstruction.

The action of the gauge 24 indicates to the operator whether the line is fully clogged or whether it is only partially clogged, and also indicates when the Freon gas begins to penetrate a fully-clogged line, this latter situation being indicated by a gradual drop in pressure at the gauge 24. For use where a line is clogged by rust or any obstruction that cannot be loosened by solvent, there is a petcock 38 for relieving the pressure when the apparatus, is to be disconnected from the pipe line.

Different formulations can be used for the material in the portable pressure tank 32. The liquified gas is preferably Freon 12 (dichlorodifluoromethane) but other liquified gases can be used that boil well below room temperature; for example Freon 22. Liquified gases such as butane and propane can be used, but it is better to have the liquified gas carrier nonflammable, because some of it eventually escapes and it constitutes a fire hazard if flammable.

For cleaning fuel oil lines kerosene may be used as the solvent with or without petroleum sulfonates such as "Petrocene A & C" sold by the Sonneborn Chemical and Refining Corp. of New York City, "Bryton High Base Barium Sulfonate C 300" sold by the Bryton Chemical Company of New York City.

For cleaning gas lines, the solvent may be perchloroethylene; trichloroethylene; methyl chloride; or chlorothene, or mixtures of these solvents.

For cleaning sewer and drain pipe lines copper chloride is preferably used as the solvent and it is desirable to include one or more algicides. For food product lines used for beer, soft drinks, and the like, a pure non-toxic alcohol is used as the solvent carried by the liquified gas propellent.

The preferred embodiment of the invention has been illustrated and described but changes and modifications can be made and some features can be used in different combinations without departing from the invention as defined in the claims.

What is claimed is:

1. A method of cleaning a clogged pipe line by means of a solvent and a carrier for the solvent, which method comprises abruptly releasing from a region of superatmospheric pressure a stream of liquefied gas containing a solvent for softening the material with which the pipe line is clogged, expanding the liquefied gas and the solvent contained therein into the pipe line with the pressure in the pipe line substantially less than the liquefaction pressure of the gas at the existing temperature whereby the gas changes suddenly to the vapor phase with resulting atomizing of the solvent, causing a wave front of the vapor and atomized solvent to flow into the pipe line and up to the region of obstruction, carrying the solvent into contact with the obstruction by means of the wave front and supplying additional vapor and solvent to the pipe line and to the obstruction at progressively higher pressures to exert force against the obstruction, increasing the pressure up to the full pressure of the liquefied gas or such lesser pressure as will break through the obstruction, and continuing the flow of carrier and solvent through the region of the obstruction after break-through of the obstruction to open up the inside cross-section of the pipe line by the combined softening action of the solvent and mechanical erosion by the carrier.

2. The method described in claim 1, characterized by building up the pressure in a pipe line that is tightly clogged and maintaining the pressure while the solvent softens the obstruction and until there is a pressure drop resulting from softening and break-through at the obstruction.

3. The method described in claim 1, characterized by building up the pressure of the carrier in a tightly clogged pipe line to a pressure in excess of the liquefaction pressure of the carrier at the existing temperature so that at least some of the carrier is liquid in the pipe line and at the region of the obstruction, maintaining the pressure while the solvent softens the obstruction, maintaining the pressure on the other side of the obstruction substantially lower than the liquefaction pressure of the solvent carrier at said existing temperature, and eroding the obstruction by scouring action of the carrier upon evaporation at the region of obstruction when the obstruction is softened by the solvent and the carrier break-through to the region of lower pressure beyond the obstruction.

4. The method described in claim 3, characterized by discharging gaseous dichlorodifluoromethane into the pipe line as the carrier and maintaining a reduced pressure beyond the obstruction at least as low as the hydraulic head of liquid in a tank with which the pipe line is connected.

5. The method described in claim 1, characterized by the pipe line being an outlet line from a fuel oil tank, the carrier and solvent being supplied to the pipe line on the side of the obstruction opposite to the end of the pipe line which connects with the pipe, and pushing at least a part of the softened obstruction back through the pipe line and into the fuel oil tank.

6. Apparatus for cleaning pipe lines including a fitting with means for connecting it with a can of liquefied gas and solvent, a needle on the fitting for piercing a seal of the can to establish a connection between the interior of the can and the interior of the fitting, a valve in the fitting, a connector for joining the apparatus with a pipe line that is to be cleaned, a passage extending from the interior of the fitting and through the connector, and a gauge between the valve and the connector for indicating the pressure in the passage.

7. The apparatus described in claim 6 characterized by a drain outlet connected with the passage and leading to the exterior of the apparatus, the drain outlet being located between the first valve and the connector, and means for opening and closing the drain outlet.

8. The apparatus described in claim 7 characterized by the means for opening and closing the drain outlet being a second valve.

9. Apparatus for cleaning pipe lines, such as oil lines, including an assembly having a passage therethrough, a detachable pipe line connector at one end of the assembly for connecting the assembly with a pipe line to be cleaned, a pressure can at the other end of the assembly for containing a solvent and a liquefied carrier gas with which the solvent is mixed, detachable fastening means connecting the pressure can to the assembly and with the pressure can upside down, said fastening means including a fitting having a needle at its upper end for piercing a seal at the end of the can when the can is initially connected to the fitting by said detachable fastening means, a valve in the assembly between the fitting and the pipe line connector for controlling communication of the pressure can with the pipe line connector, a pressure relief line opening through a side of the passage in a different direction from the fitting and at a location between the valve and the pipe line connector, and a second valve for opening and closing the pressure relief line to relieve any remaining pressure from the passage after the first valve is closed and before disconnecting the pipe line connector from a pipe line.

References Cited by the Examiner
UNITED STATES PATENTS

| | | | |
|---|---|---|---|
| 1,034,301 | 7/12 | Redeker | 134—17 |
| 1,328,726 | 1/20 | Dezendorf. | |
| 1,940,506 | 12/33 | Peck | 134—102 XR |
| 2,065,462 | 12/36 | Olsson | 134—36 XR |

CHARLES A. WILLMUTH, *Primary Examiner.*